US007925647B2

(12) United States Patent
Das et al.

(10) Patent No.: US 7,925,647 B2
(45) Date of Patent: *Apr. 12, 2011

(54) TECHNIQUES FOR OPTIMIZING SQL STATEMENTS USING USER-DEFINED INDEXES WITH AUXILIARY PROPERTIES

(75) Inventors: Dinesh Das, Redwood City, CA (US); Wesley Lin, West Covina, CA (US); Seema Sundara, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 562 days.

This patent is subject to a terminal disclaimer.

(21) Appl. No.: 12/027,918

(22) Filed: Feb. 7, 2008

(65) Prior Publication Data
US 2009/0030874 A1   Jan. 29, 2009

Related U.S. Application Data

(60) Provisional application No. 60/952,455, filed on Jul. 27, 2007.

(51) Int. Cl.
G06F 17/30 (2006.01)
(52) U.S. Cl. ............... 707/719; 707/999.2; 707/715; 707/718; 707/720
(58) Field of Classification Search ............ 707/999.2, 707/713, 715, 718, 719
See application file for complete search history.

(56) References Cited

U.S. PATENT DOCUMENTS

| 5,893,104 | A  |   | 4/1999 | Srinivasan et al. |
|-----------|----|---|--------|-------------------|
| 6,338,056 | B1 | * | 1/2002 | Dessloch et al. ............. 707/711 |
| 6,370,522 | B1 |   | 4/2002 | Agarwal et al. |
| 2006/0167850 | A1 |   | 7/2006 | Fish et al. |
| 2008/0059440 | A1 |   | 3/2008 | Barsness et al. |
| 2009/0030883 | A1 |   | 1/2009 | Das |

OTHER PUBLICATIONS

Benoit Dageville et al., "Automatic SQL Tuning in Oracle 10g", Proceeding of the $30^{th}$ VLDB Conference, Toronto, Canada, 2004, pp. 1098-1109.*

* cited by examiner

Primary Examiner — Etienne P LeRoux
Assistant Examiner — Monica M Pyo
(74) Attorney, Agent, or Firm — Hickman Palermo Truong & Becker LLP

(57) ABSTRACT

In one embodiment, a database server registers one or more functions included in a user-defined index that includes one or more auxiliary properties. The database server receives a query that specifies one or more parameters. A query optimizer generates a plurality of execution plans for evaluating the query. The query optimizer estimates a plurality of total costs respectively associated with the plurality of execution plans, where estimating a particular total cost associated with a particular execution plan comprises: invoking the one or more functions with one or more function arguments based on the one or more parameters; receiving one or more index costs that are associated with using the one or more auxiliary properties of the user-defined index to evaluate the query; and determining the particular total cost based on the one or more index costs. From the plurality of execution plans, the query optimizer selects an optimal execution plan that is associated with an optimal total cost of the plurality of total costs.

22 Claims, 3 Drawing Sheets

TECHNIQUES FOR OPTIMIZING SQL STATEMENTS USING USER-DEFINED INDEXES WITH AUXILIARY PROPERTIES

PRIORITY CLAIM; CROSS-REFERENCE TO RELATED APPLICATIONS

This application claims benefit of U.S. Provisional Application Ser. No. 60/952,455, filed on Jul. 27, 2007 by Dinesh Das et al. and entitled "METHOD AND MECHANISM FOR OPTIMIZING SQL STATEMENTS USING USER DEFINED INDEXES WITH AUXILIARY PROPERTIES", the entire contents of which is hereby incorporated by reference as if fully set forth herein, under 35 U.S.C. 119(e).

This application is related to U.S. application Ser. No. 12/027,897, filed on Feb. 7, 2008 by Dinesh Das et al. and entitled "Techniques For Extending User-Defined Indexes With Auxiliary Properties", the entire contents of which is hereby incorporated by reference as if fully set forth herein.

FIELD OF THE INVENTION

The present invention generally relates to query processing. The invention relates more specifically to techniques for optimizing queries using user-defined indexes with auxiliary properties.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In one approach for using user-defined indexes to evaluate queries, a conventional user-defined index provides a cost function which, when invoked by a query optimizer of a database server, returns a cost of using the index to evaluate a portion of a query. Based on the returned cost, the query optimizer then makes a decision whether to use the user-defined index to evaluate the query portion in the execution plan that the query optimizer generates for the query.

This approach, however, suffers from several disadvantages. One disadvantage of this approach is that the cost returned by the cost function of the conventional user-defined index indicates the cost of using the entire index. This is because a conventional user-defined index can only evaluate a query predicate that includes a user-defined operator that is supported by the index. Thus, the cost returned by the cost function of the user-defined index is largely invariable because it is only associated with the evaluation of the same user-defined operator. In turn, this causes the query optimizer to generate sub-optimal execution plans for queries that include predicates with that user-defined operator.

Another disadvantage of this approach is that it results in the query optimizer deciding whether to use a user-defined index on an all-or-nothing basis. Since a conventional user-defined index can be used to evaluate only a specific user-defined operator and since the cost returned by the cost function of the user-defined index is largely invariable, the query optimizer of a database server is forced into making a choice of whether to use or not to use the user-defined index in the execution plan that the query optimizer generates for a query. In turn, this limits the options that might be otherwise available to the query optimizer for generating an execution plan that can be used by a database server to evaluate the query more efficiently and with less processing resources such as memory, CPU time, and I/O cycles.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
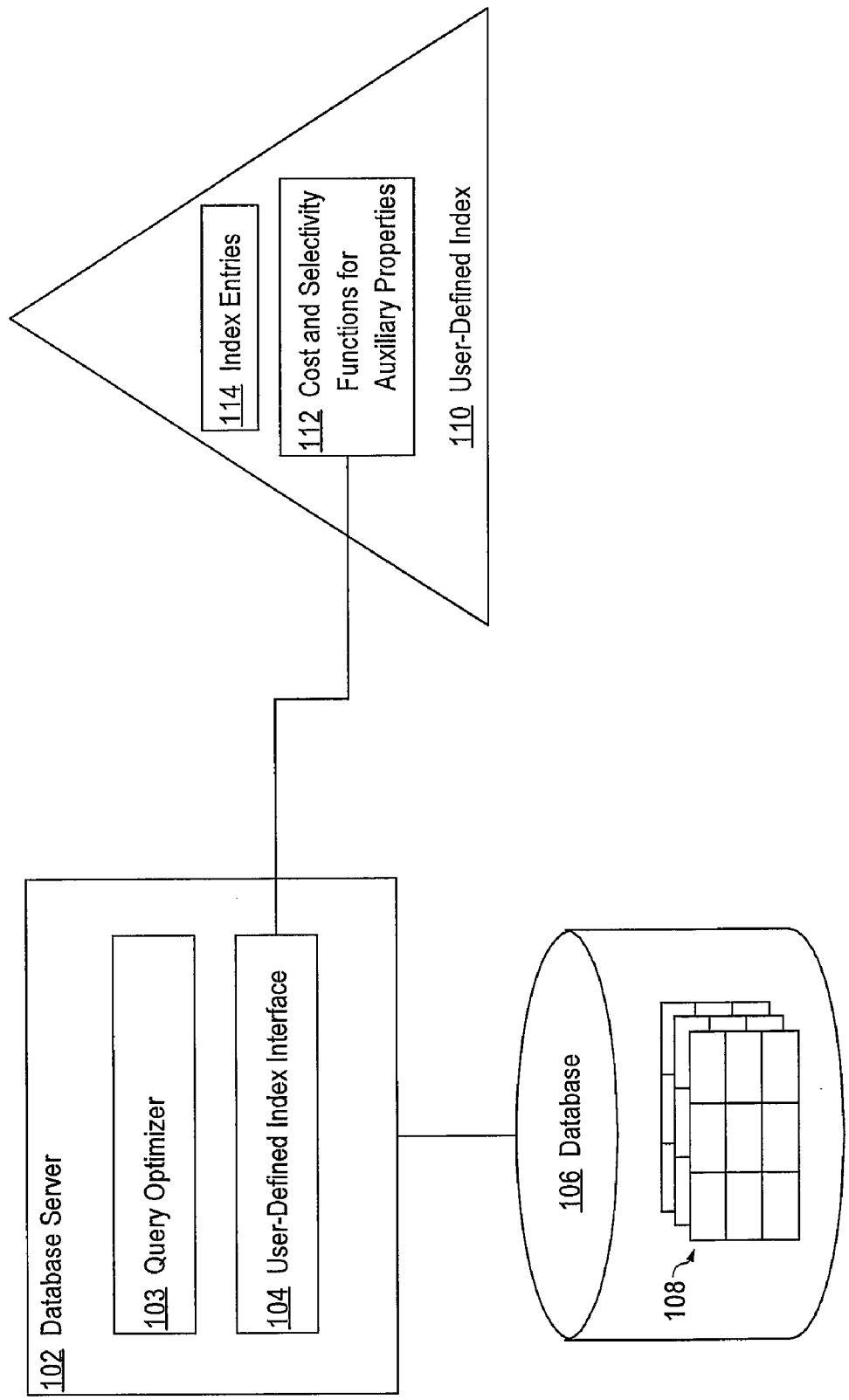
FIG. 1 is a block diagram that illustrates structural details of an example embodiment in which user-defined indexes with auxiliary properties may be used to optimize queries.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

As used herein, "index" refers to a combination of index entries and a set of functions, where the functions when executed are operable to at least create and maintain the index entries and to use the index entries to access and/or process various data. "Function" refers to a set of code that can be invoked or called by an entity such as a database server. "User-defined index" refers to an index with index entries and a set of functions such that the structure of the index entries and the semantics of the set of functions are expressly defined by a user and are not defined in the native executable code of the database server. The set of functions in a user-defined index maintain and use the index entries of the user-defined index outside of the database server (e.g., outside of the memory address space allocated to the database server). It is noted that apart from registrations of the functions of a user-defined index, the database server does not store any information about the specific data structures in which the index entries are stored.

In some implementations, when the database server or a component thereof decides to use a user-defined index to evaluate a predicate or a clause of a query, the database server invokes the appropriate function of the index with the appropriate function arguments. When invoked, the function evaluates the query predicate or clause, and returns to the database server a set of row identifiers that identify a set of data rows from the underlying table that satisfy the query predicate or clause. The database server then combines as necessary the data rows identified by the returned row identifiers with data rows from other row sources in order to generate the result set of data rows to which the query evaluates.

Example implementations of a user-defined index are described in Srinivasan et al., U.S. Pat. No. 5,893,104, which issued on Apr. 6, 1999 and is titled "Method And System For Processing Queries In a Database System Using Index Structures That Are Not Native To the Database System".

Cost and Selectivity Functions for Auxiliary Properties

Techniques are described herein for optimizing queries using user-defined indexes with auxiliary properties. The techniques described herein may be used to optimize any type of queries and database statements including, but not limited to, Structured Query Language (SQL) queries, XML Query Language (XQuery) queries, and any equivalents thereof.

As used herein, "property" refers to a capability of a user-defined index to provide a particular functionality. A property of a user-defined index is implemented by one or more functions of the index based on the index entries. Typically, a user-defined index has a primary property that provides for evaluating a particular user-defined query operator.

As used herein, "auxiliary property" refers to a capability of a user-defined index to provide a functionality that is different than, and in addition to, the functionality provided by the primary property of the user-defined index. An auxiliary property of a user-defined index is expressly defined by a user and is not implicitly provided by the organization of the index. The auxiliary property of a user-defined index may be specified by a user through one or more parameters of a data definition language (DDL) statement that creates the index. A user-defined index may provide one or more functions which, when invoked by a database server with the appropriate arguments, are operable to evaluate one or more query predicates based on the index entries created and maintained for one or more auxiliary properties of the index. Examples of auxiliary properties of a user-defined index include, but are not limited to, a filtering auxiliary property for filtering the index entries of the index based on conditions that are associated with the one or more table columns over which the filtering auxiliary property is defined, and an ordering auxiliary property for sorting the index entries of the index based on an order determined according to the one or more table columns over which the ordering auxiliary property is defined. It is noted, however, that the techniques described herein are not limited to using user-defined indexes only with filtering and ordering auxiliary properties; rather, the techniques described herein may be implemented for any number of different other types of auxiliary properties in various embodiments.

The auxiliary properties of a user-defined index are not implicitly defined or determined by the organization of the index entries. It is also noted that the auxiliary properties described herein are different from implicit properties of regular indexes. For example, a regular B-tree index defined over columns A, B, and C of a given table has the implicit property of ordering the rows of the given table according to the values in columns A, B, C. In another example, a regular B-tree index defined over columns A, B, and C of a given table has the implicit property filtering the rows of the given table based on the values in columns A, B, and C. In contrast, the auxiliary properties of a user-defined index described herein do not depend on the implicit capabilities determined by the organization of the index; rather, the auxiliary properties are explicitly defined by a user.

According to the techniques described herein, a user-defined index may provide one or more cost and/or selectivity functions which, when invoked by a database server with the appropriate arguments, are operable to determine and return various metrics associated with using the auxiliary properties of the index to evaluate query predicates and clauses. Such metrics may include, without limitation, costs of using one or more auxiliary properties to evaluate query predicates and clauses, and the selectivity of the index entries that support the one or more auxiliary properties of the user-defined index.

As used herein, "cost" refers to a value that quantifies the expenditure of processing resources when a user-defined index and/or any auxiliary properties thereof are used to evaluate query predicates and clauses. "Selectivity" refers to a value that indicates the uniqueness within a set of index entries that support the primary property and/or any auxiliary properties of a user-defined index. "Index cost" as used herein refers to any value, such as a cost value or a selectivity value, which can be returned by a cost or selectivity function of a user-defined index.

Since user-defined indexes are defined by a user, the query optimizer of a database server has no information about the index costs that are associated with evaluating a particular predicate or clause of a query. In order to determine whether to use a user-defined index to evaluate the query, the query optimizer invokes a function of the index which, when executed, returns to the query optimizer an index cost associated with using the index. For example, when invoked, a cost function of a conventional user-defined index may return an index cost associated with using the primary property of the index to evaluate a query predicate that specifies a user-defined operator that is supported by the index. Example implementations of a cost function for a conventional user-defined index are described in Agarwal et al., U.S. Pat. No. 6,370,522, which issued on Apr. 9, 2002 and is titled "Method And Mechanism For Extending Native Optimization In a Database System".

However, a user-defined index may be extended with auxiliary properties. Thus, the costs of using the auxiliary properties of the user-defined index for evaluating query predicates and clauses may be different than the costs of using the primary property of the index to evaluate the query predicates and clauses. For example, a different index cost may be associated with using each different auxiliary property of the user-defined index. For this reason, in order for the query optimizer of a database server to generate an efficient query plan for a given query, the query optimizer needs to account for any index costs associated with using any auxiliary properties (or any combinations thereof) to evaluate some or all of the query predicates and clauses of the given query.

To address this need, the techniques described herein provide cost and/or selectivity functions for the auxiliary properties of a user-defined index. The query optimizer of a database server may invoke these cost and selectivity functions in order to estimate the relative and total costs of using the auxiliary properties of the user-defined index to evaluate the query predicate(s) or clause(s) of a query. For example, the use of a filtering auxiliary property of the user-defined index may be associated with a different cost than the cost of using the user-defined index but not the filtering auxiliary property thereof. In another example, the use of an ordering auxiliary property of the user-defined index to sort the data set returned to the database server may be associated with a different cost that the cost of using the user-defined index to return an unsorted data set to the database server. By providing cost and selectivity functions that return index costs associated with using the auxiliary properties of the user-defined index, the techniques described herein provide the query optimizer of the database server with the ability to explore the total costs of more different execution plans for evaluating a query. In turn, this allows the query optimizer to select from a plurality of execution plans the optimal execution plan that provides for evaluating the query with the optimal use of processing resources.

Structural Description of an Example Embodiment

FIG. 1 is a block diagram that illustrates structural details of an example embodiment in which user-defined indexes with auxiliary properties may be used to optimize queries.

In FIG. 1, database server 102 is operable to manage access to one or more databases, such as database 106, which may include one or more tables such as tables 108. Database server 102 is also communicatively coupled to user-defined index 110, which is extended with one or more auxiliary properties.

As used herein, "server" refers to a set of integrated software components which, when executed, may be allocated computational resources, such as memory, a CPU time, and storage space for providing a particular type of functionality on behalf of clients of the server. "Database server" refers to a server that provides database management functionalities. Among other functionalities of database management, a database server may govern and facilitate access to one or more databases, and may process requests and queries by clients to access and return data stored in the databases. In various embodiments, a database server may be implemented as a single server instance or as a cluster of multiple server instances.

Among other components, database server 102 comprises query optimizer 103 and user-defined index interface 104. Query optimizer 103 may be implemented as a set of one or more software components which, when executed by the database server, are operable to at least estimate the costs associated with using an execution plan to evaluate a query. In various embodiments, the components comprising query optimizer 103 may also be operable to generate multiple execution plans for a query, to estimate the costs associated with using each of the multiple execution plans to evaluate the query, and to select from the multiple execution plans an optimal execution plan according to one or more specific criteria. In various embodiments, the components that comprise query optimizer 103 may be implemented as software modules executable under the control of the database server, as a library of functions, as one or more dynamically linked libraries (DLLs), or as any other type of software and/or hardware components that are operable to provide query optimization functionalities.

User-defined index interface 104 may be implemented as a set of one or more components which, when executed by the database server, are operable to register and invoke the functions of user-defined indexes such as user-defined index 110. In various embodiments, the set of one or more components that comprise interface 104 may be implemented as software modules executable under (or outside of) the control of the database server, as a library of functions, as one or more dynamically linked libraries (DLLs), or as any other type of software and/or hardware components that are operable to provide interfacing capabilities to the database server.

In some embodiments, database 106 may be a relational database that stores data in various relational data objects including, but not limited to, relational tables, views, and materialized views. In other embodiments, database 106 may be an object-relational database that stores data in various data objects that are instantiated from various object classes. In yet other embodiments, database 106 may be a database that stores extensible markup language (XML) data in various data objects and/or files. The techniques described herein for optimizing queries using user-defined indexes with auxiliary properties are not limited to being implemented for any particular type of database; rather, the techniques described herein may be implemented for any type of databases that allow use of user-defined indexes to search the data stored in the databases.

According to the techniques described herein, user-defined index 110 is extendable with auxiliary properties. User-defined index comprises index entries 114 which can be used to evaluate various query predicates and clauses in accordance with the auxiliary properties of the index.

User-defined index 110 also comprises a set of functions that include, among other functions, functions 112. Functions 112 include cost functions and selectivity functions that are operable to return cost values and selectivity values associated with using the auxiliary properties of user-defined index 110 to evaluate predicate(s) and clause(s) of queries received for evaluation at database server 102. As used herein, "cost function" refers to a function which, when invoked, returns a cost that would be incurred when one or more auxiliary properties of a user-defined index are used to evaluate a query portion based on index entries of the index. "Selectivity function" refers to a function which, when invoked, returns a selectivity value associated with using one or more auxiliary properties of a user-defined index to evaluate a query portion based on the index entries of the index.

In various embodiments, and in accordance with the techniques described herein, the cost and selectivity functions may be implemented in various programming or scripting languages such as, for example, C++, JAVA®, SQL, and PL/SQL. Further, in various embodiments the cost and selectivity functions may be implemented by using various algorithms to determine costs and selectivity values. It is noted that the manner in which the cost and selectivity functions are implemented and the algorithms that they use depend entirely on the person that implements the user-defined index. For this reason, the techniques described herein are not limited to any particular implementation of cost and selectivity functions of a user-defined index.

In some embodiments, and in accordance with the techniques described herein, the cost and selectivity functions may be implemented as functions that are different from the functions that can be used to evaluate query predicates and clauses against the primary property and the auxiliary properties of a user-defined index. In other embodiments, the cost and selectivity functions may be implemented as the same function that is operable to evaluate query predicates and clauses against the primary and the auxiliary properties of a user-defined index. In these embodiments, the function of the user-defined index may be prototyped with one set of function arguments that request the use of the primary and auxiliary properties of the index and with another set of function arguments that indicate for which index property the cost and selectivity values are requested; when the database server invokes this function, the database server would set the appropriate function arguments in order to indicate which functionality of the user-defined index is requested.

In operation, database server 102 registers through interface 104 cost and selectivity functions 112 of user-defined index 110. For example, in some embodiments database server 102 may register functions 112 as part of instantiating user-defined index 110 from an object-oriented class that defines the user-defined index as having a particular index type. In these embodiments, along with the definitions for the user-defined index, the object-oriented class also includes the prototypes of cost and selectivity functions 112. Thus, when the database server creates user-defined index 110 as an instance of the object-oriented class, the database server would also create the necessary references and registrations of cost and selectivity functions 112.

In other embodiments, database server 102 may register cost and selectivity functions 112 in any suitable manner and through any suitable mechanism. For example, interface 104 may store in one or more data structures (e.g., tables, arrays, lists, etc.) metadata information associated with cost and selectivity functions 112. Such metadata information may include, without limitation, number and type of input arguments for each function, the type of data or arguments returned by each function, a pointer referencing the starting address in memory of each function, and any other information that may be needed by database server 102 to invoke each function. It is noted that the techniques described herein are not limited to any particular mechanism through which the database server may register the cost and selectivity functions of the user-defined index. Thus, the examples of mechanisms for registering the cost and selectivity functions described herein are to be regarded in an illustrative rather than a restrictive sense.

After database server 102 has registered functions 112, the database server and/or query optimizer 103 may invoke these functions to retrieve any costs and selectivity values associated with using the auxiliary properties of user-defined index 110 to evaluate query predicates and clauses.

For example, database server 102 may receive a database statement that includes a query that comprises one or more parameters. Database server 102 parses the query and invokes query optimizer 103 to generate and determine an optimal execution plan for the query. In determining the optimal execution plan, query optimizer 103 may generate and explore multiple execution plans for the query. Query optimizer 103 then estimates a total cost for each query execution plan. For query execution plans that do not use any user-defined indexes, query optimizer 103 may determine the total cost of each such execution plan according to any now known or later developed cost estimation mechanism that is provided by database server 102.

For each particular query execution plan that uses user-defined index 110, according to the techniques described herein query optimizer 103 invokes the cost and selectivity functions 112 with function parameters that include, or are otherwise based on, the one or more parameters specified in the query. When invoked, the cost and selectivity functions 112 determine and return to query optimizer 103 one or more index costs associated with using the user-defined index 110 to evaluate the query. For example, to estimate a particular query execution plan that uses a filtering auxiliary property and an ordering auxiliary property of user-defined index 110, query optimizer 103 may invoke cost and selectivity functions 112 separately for each auxiliary property; when invoked for each auxiliary property, cost and selectivity functions 112 return cost and selectivity values associated with using that auxiliary property. After receiving the index costs for a particular query execution plan from cost and selectivity functions 112, query optimizer 103 determines the total cost of that particular execution plan based on the received index costs.

After determining the total cost for each of the generated multiple execution plans, query optimizer 103 selects the optimal execution plan based on the determined total costs. For example, query optimizer 103 may select as the optimal execution plan that particular execution plan, from the multiple execution plans, which is associated with an optimal total cost.

After query optimizer 103 selects the optimal query execution plan, the query optimizer stores or causes the optimal query execution plan to be stored in volatile memory and/or in persistent storage in association with the received query. Thereafter, database server 102 or a component thereof may use the optimal query execution plan to evaluate the query.

In this manner, the techniques described herein provide for optimizing queries by using the auxiliary properties of a user-defined index. As a result, the queries are evaluated by using an optimal amount of data processing resources. This is particularly beneficial for mixed queries that can be evaluated both with and without using a user-defined index and auxiliary properties thereof.

Cost and Selectivity for a Filtering Auxiliary Property

The techniques described herein provide for optimizing queries by using a user-defined index with a filtering auxiliary property. The filtering auxiliary property provides for filtering the index entries of the user-defined index based on conditions that are associated with the table column or columns over which the filtering auxiliary property is defined.

A filtering auxiliary property of a user-defined index may be specified by a user in a "CREATE INDEX" or "ALTER INDEX" data definition language (DDL) statement that uses the keyword "FILTER BY" followed by a list of columns. When such DDL statement is executed by a database server, the database server or a component thereof invokes a function of the user-defined index. When invoked, the function generates and stores in the user-defined index a set of index entries that can be used to evaluate various conditions that are specified against any or all columns in the list of columns. Each index entry that is generated and stored to support the filtering auxiliary property may include a variety of fields including, but not limited to, a field for storing a row identifier that identifies a particular row in the underlying table over which the user-defined index is created, and one or more fields for storing the values from the particular row for the one or more columns in the list of columns specified after the "FILTER BY" keyword.

For example, a user-defined index "DOCIDX" may be defined over a table "DOC" as follows:

create index DOCIDX on DOC (document) indextype is (context) FILTER BY pub_date where the "FILTER BY" keyword indicates that a filtering auxiliary property is defined in the "DOCIDX" user-defined index, and the parameter after the "FILTER BY" keyword indicates that the index entries that support this filtering auxiliary property may be used to evaluate conditions that are specified against the "pub_date" column of table "DOC". The primary property of the "DOCIDX" user-defined index is defined over column "document" of table "DOC" and can be used to evaluate a "CONTAINS" user-defined operator. An example of a query predicate that includes a condition that can be evaluated by the filtering auxiliary property of the "DOCIDX" user-defined index is the following query predicate:

('pub_date' between '01/01/2007' and '12/31/2007')

In some embodiments, a cost function of a user-defined index may be operable to return the cost of using the filtering auxiliary property of the index to evaluate a particular condition. For example, a query optimizer of a database server may invoke the cost function with function arguments that specify the particular condition. When invoked, the cost function may use any now known or later developed cost estimation mechanism to determine a cost value which reflects the use of the index entries that support the filtering auxiliary property to evaluate the particular condition.

Similarly, in some embodiments a selectivity function of a user-defined index may be operable to return the selectivity of the set of index entries, which support the filtering auxiliary property of the index, with respect a particular condition. For example, a query optimizer of a database server may invoke the selectivity function with function arguments that specify the particular condition. When invoked, the selectivity function determines and returns a selectivity value that reflects the selectivity of the index entries for the filtering auxiliary property with respect to the particular condition.

Cost and Selectivity for an Ordering Auxiliary Property

The techniques described herein provide for optimizing queries by using a user-defined index with an ordering auxiliary property. The ordering auxiliary property provides for sorting table rows based on index entries of the user-defined index according to an order that is specified with respect to the values stored in the one or more table columns over which the ordering auxiliary property is defined.

In an example embodiment, an ordering auxiliary property may be specified by a user in a "CREATE INDEX" or "ALTER INDEX" DDL statement that uses the keyword "ORDER BY" followed by a list of columns from the underlying table over which the user-defined index is created. When such DDL statement is executed by the database server, the database server or a component thereof invokes a function of the user-defined index. When invoked, the function generates and stores in the user-defined index a set of index entries that can be used to sort the rows of the underlying table according to an order that is specified with respect to the list of columns specified in the DDL statement. Each index entry that is generated and stored to support the ordering auxiliary property may include a variety of fields including, but not limited to, a field for storing a row identifier that identifies a particular row in the underlying table, and one or more fields for storing the values from the particular row for the one or more columns in the list of columns specified after the "ORDER BY" keyword in the DDL statement.

For example, a user-defined index "DOCIDX" may be defined over a table "DOC" as follows:

```
create index DOCIDX on DOC (document) indextype is (context)
               ORDER BY pub_date
``` where the "ORDER BY" keyword indicates that an ordering auxiliary property is defined in the "DOCIDX" user-defined index, and the parameter after the "ORDER BY" keyword indicates that the index entries that support this ordering auxiliary property may be sorted based on the values in the "pub_date" column of table "DOC". The primary property of the "DOCIDX" user-defined index is defined over column "document" of table "DOC" and can be used to evaluate a "CONTAINS" user-defined operator. An example of a query predicate that includes an ORDER BY clause that can be evaluated by the ordering auxiliary property of the "DOCIDX" user-defined index is the following query predicate:

order by pub_date

In some embodiments, a cost function of a user-defined index may be operable to return the cost of using the ordering auxiliary property to sort data rows in a particular order. For example, a query optimizer of a database server may invoke the cost function with function arguments that specify the particular order. When invoked, the cost function may use any now known or later developed cost estimation mechanism to determine a cost value which reflects the use of the index entries that support the ordering auxiliary property to sort in the particular order any results that are returned to the database server. Since in some operational scenarios the user-defined index may sort rows more efficiently than the database server, invoking the cost function of the user-defined index allows the query optimizer to estimate the costs of sorting by using both the user-defined index and the mechanisms provided by the database server. In this manner, the techniques described herein enable the query optimizer to select an execution plan that has an optimal sorting cost.

Functional Description of an Example Embodiment

Figure 2:
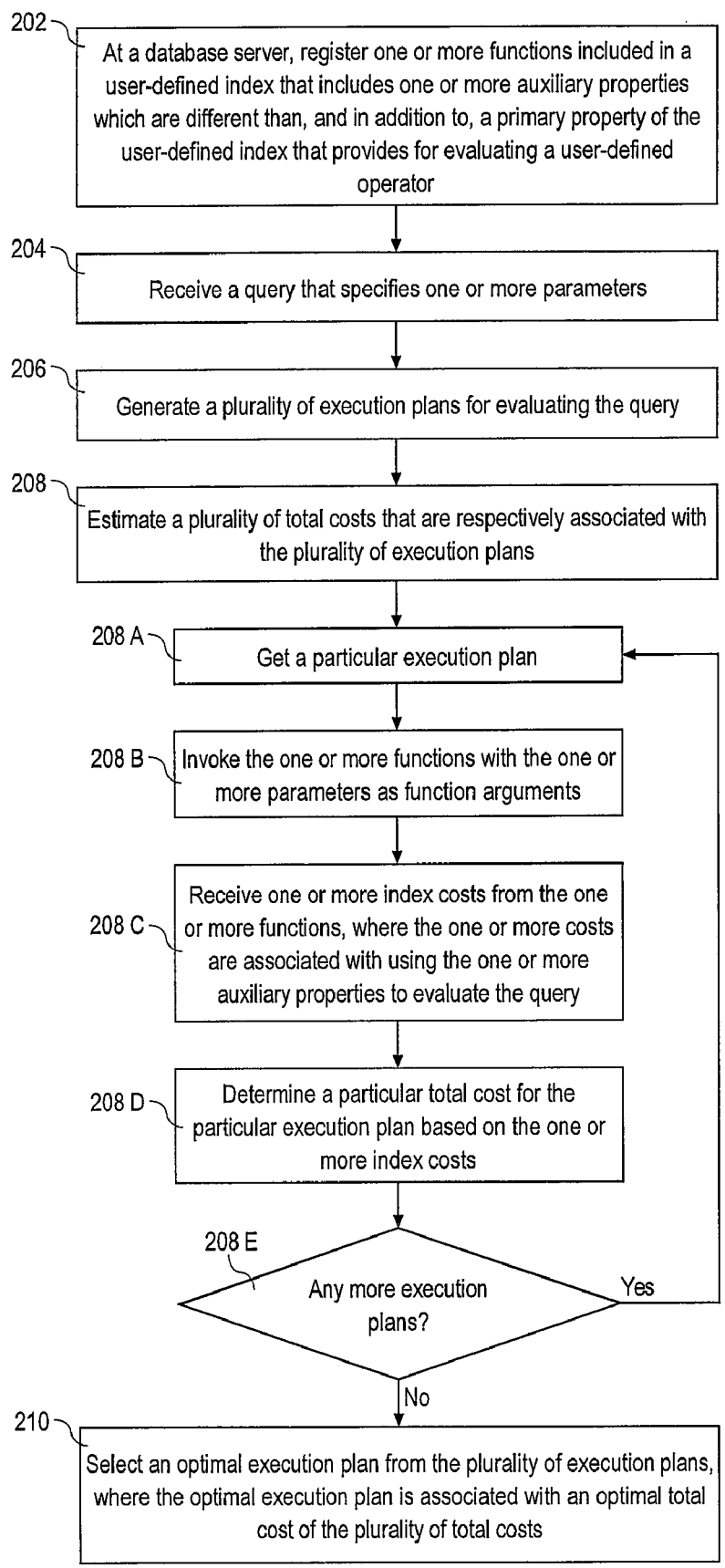
FIG. 2 is a flow diagram that illustrates an example method for optimizing queries using user-defined indexes with auxiliary properties according to one embodiment.

FIG. 2 is a flow diagram that illustrates an example method for optimizing queries using user-defined indexes with auxiliary properties according to one embodiment.

In step 202, a database server or a component thereof registers one or more cost and selectivity functions that are included and implemented in a user-defined index. The user-defined index includes one or more auxiliary properties that are different from, and in addition to, a primary property of the user-defined index that provides for evaluating a particular query operator.

In step 204, the database server or a component thereof receives a query that specifies one or more parameters. The query may be included in a database statement or a database request that is submitted to the database server by a database application or through a database client. The query may conform to any one of a number of query languages including, but not limited to, SQL, XQuery, and XQueryX.

In step 206, the database server or a component thereof (e.g., a query optimizer) may generate and explore multiple execution plans for evaluating the query in order to determine an optimal execution plan for the query. Examples of the types of the generated multiple execution plans may include, without limitation, the following:

- a query execution plan that does not use any user-defined index to evaluate the query;
- a query execution plan that uses only the primary property of a user-defined index but not any auxiliary property of the index to evaluate the query;
- a query execution plan that uses the primary property and one or more (but not all) auxiliary properties of a user-defined index to evaluate the query; and
- a query execution plan that uses the primary property and all of the auxiliary properties of user-defined index to evaluate the query.

In step 208, the database server or a component thereof estimates the total cost for each of the generated multiple execution plans. It is noted that in some embodiments, the database server may perform steps 206 and 208 sequentially for each query execution plan that is generated—that is, the total cost of a particular execution plan is estimated as soon as that plan is generated and before any other execution plans are generated. In some embodiments, the database server may perform the entire step 206 before performing step 208—that is, the database server may first generate all query execution plans that it needs, and then may estimate the total cost for each generated execution plan. Thus, the order of performing steps 206 and 208 in FIG. 2 is to be regarded in an illustrative rather than a restrictive sense.

Estimating the total costs of the generated multiple execution plans in step 208 may include performing steps 208A-208E for each execution plan that specifies use of the user-defined index.

In step 208A, a particular execution plan is selected for exploration. In this step, the database server or a component thereof may determine whether the selected execution plan specifies use of the user-defined index or of any primary and/or auxiliary property thereof. For example, the database server or the component thereof may determine whether the query parameters include any predicate that defines any condition that is based on the user-defined operator that is supported by the user-defined index. If the query parameters specify at least one such predicate, then the database server or the component thereof may determine that the selected execution plan specifies use of the user-defined index, and steps 208B-208D may be performed to estimate the total cost of that execution plan. If the database server or the component thereof determines that the query parameters do not include any predicates that define any conditions that are based on the user-defined operator, then the selected execution plan does not specify use of the user-defined index, and the database server may estimate the total cost for the execution plan by using the regular cost-estimation mechanisms provided by the database server.

In step 208B, the database server or a component thereof invokes the cost function and/or the selectivity functions of all properties of the user-defined index that are specified in the selected execution plan. The database server may invoke the cost and selectivity functions with function arguments that include, or are based on, the one or more parameters specified in the received query.

For example, the selected execution plan may specify use of the primary property of the user-defined index but not of any auxiliary properties of the index. In this example, the database server or the component thereof would invoke the cost and selectivity functions that are associated with the primary property of the index.

In another example, the selected execution plan may specify use of the primary property of the user-defined index and use of some (but not all) auxiliary properties of the index. In this example, the database server or the component thereof would invoke the cost and selectivity functions that are associated with the primary property of the index and the cost and selectivity functions that are associated with the specified auxiliary properties of the index. Thus, in this example the database server or the component thereof may invoke the cost and selectivity functions of the user-defined index multiple times—e.g., one or more invocations for each of the primary property and the specified auxiliary properties of the index.

In another example, the selected execution plan may specify use of the primary property of the user-defined index and use of all auxiliary properties of the index. In this example, the database server or the component thereof would invoke the cost and selectivity functions that are associated with the primary property of the index and the cost and selectivity functions that are associated with each of the auxiliary properties of the index. In this example, the database server or the component thereof may also employ multiple invocations of the cost and selectivity functions of the user-defined index.

In response to invoking the cost and selectivity functions of the user-defined index, in step 208C the database server or the component thereof receives one or more index costs that are associated with using the user-defined index and any properties thereof to evaluate the query. The received index costs may include any or both of cost values and selectivity values. For example, if the execution plan selected in step 208A specifies use of the primary property of the user-defined index but not use of any auxiliary properties of the index, the one or more index costs received in step 208C would include the cost and selectivity values associated with using the index entries that support the primary property of the index. If the selected execution plan specifies use of any auxiliary properties of the user-defined index (e.g., a filtering property and/or an ordering property), the received index costs may include a cost value and a selectivity value associated with each of the specified auxiliary properties.

In step 208D, the database server or the component thereof determines a total cost of the execution plan selected in step 208A based on the one or more index costs received in step 208C. In some implementations, the database server or the component thereof may determine the total cost of an execution plan that specifies use of a user-defined index with auxiliary properties according to the following formula:

$$\text{TOTAL COST} = C_{other} + C1_{udi} + C2_{udi} + \ldots + Ci_{udi} + \ldots + Cn_{udi}$$

where:
$C_{other}$ is the cost of any processing performed outside the user-defined index, and
$C1_{udi}, C2_{udi}, \ldots Ci_{udi} \ldots, Cn_{udi}$ are costs associated with using each of the properties (primary and auxiliary) of the user-defined index that are specified in the execution plan, where $$Ci_{udi} = (\text{cost of access to the user-defined index}) + (\text{cost of access for a single index entry of } i^{th} \text{ index property}) * (\text{selectivity}) * (\text{number of index entries for } i^{th} \text{ index property})$$

The database server may determine the cost of processing outside of the user-defined index according to any now known or later developed mechanisms. The various cost and selectivity values, which are used to determine the cost ("$Ci_{udi}$") of using the $i^{th}$ property of the user-defined index, are determined based on the index costs and other information (e.g., costs of single index entry access, selectivity, number of index entries, etc.) that are returned by the cost and selectivity functions for that index property. It is noted that the above formula for estimating the total cost is purely illustrative, and different embodiments may use different cost estimation formulas, algorithms, and mechanisms.

In step 208E, the database server or the component thereof determine whether there are any more of the generated multiple execution plans for which the total cost needs to be estimated. If there are more execution plans, step 208A is performed to select the next execution plan and steps 208B-208D are performed to estimate the total cost of that execution plan. If the total costs for all of the generated multiple execution plans have been generated, step 210 is performed.

In step 210, the database server or the component thereof selects an optimal execution plan from the plurality of execution plans based on their respective estimated total costs. For example, the database server or the component thereof may compare the total costs of all the generated execution plans, including any execution plans that do not specify use of the user-defined index to evaluate the query. Based on the comparison, the database server or the component thereof may select as the optimal execution plan that particular plan which is associated with an optimal total cost. The optimal total cost may be determined based on one or more specific criteria that may include, without limitation, the lowest amount of volatile memory used, the lowest amount of CPU time used, and the lowest number of I/O cycles used. The techniques described herein are not limited to any particular manner or any particular criteria or combination of criteria that may be used to define and determine what constitutes an optimal total cost and/or an optimal query execution plan.

After the database server or the component thereof selects the optimal execution plan, the database server may use the optimal execution plan to evaluate the query and return (to the application or client that submitted the query) the result set of data to which the query evaluates. For example, the database server may use the optimal execution plan to evaluate the query immediately after the optimal execution plan is selected. In another example, the database server may store the optimal execution plan in volatile memory or in persistent storage for future use.

An Operational Example

To illustrate the techniques for optimizing queries by using user-defined indexes with auxiliary properties, consider the following operational example.

Suppose that in an example embodiment table "DOC" is created by executing the following DDL statement at a database server:

```
create table DOC (docID      number,
                  author     varchar(30),
                  pub_date   date,
                  document   CLOB)
``` where column "document" stores entire documents as values of a CLOB data type, column "pub_date" stores the publication date of the document stored in the same row as a value of a date data type, column "author" stores the name of the author of the document stored in the same row as a value of a varchar data type, and column "docID" stores the document ID of the document stored in the same row as a value of a number data type. Suppose also that a certain amount of data is inserted in the columns of table "DOC" after the table is created.

Suppose also that the following DDL statement is executed by the database server in order to create a user-defined index with extended properties over table "DOC":

```
create index DOCIDX on DOC (document) indextype is (context)
       ORDER BY pub_date
       FILTER BY pub_date
```

When the database server executes the above DDL statement, user-defined index "DOCIDX" is created on column "document" of the "DOC" table, and this index is of a "context" index type. The "DOCIDX" index may be used to evaluate a "CONTAINS" operator against the "document" column of the "DOC" table.

The above DDL statement also specifies that two auxiliary properties are also created in the "DOCIDX" index. The keyword "ORDER BY" indicates that an ordering auxiliary property is created; the parameter "pub_date" associated with the "ORDER BY" keyword indicates that the index entries supporting the ordering auxiliary property are created over column "pub_date" of the "DOC" table. The keyword "FILTER BY" indicates that a filtering auxiliary property is created; the parameter "pub_date" associated with the "FILTER BY" keyword indicates that the index entries supporting the filtering auxiliary property are created over column "pub_date" of the "DOC" table.

In accordance with the techniques described herein, when the "DOCIDX" index is created the database server registers one or more cost and selectivity functions for the index, where the cost and selectivity functions, when invoked, are operable to return cost and selectivity values associated with using the index and the primary and auxiliary properties thereof to evaluate query predicates and clauses.

Suppose now that the database server receives for evaluation the following query "Q1" from a client:

```
Q1.   select    docID, author
      from      DOC
      where     CONTAINS (document, 'Oracle') > 0 and
                pub_date between '01/01/2007' and '12/31/2007'
      order by  pub_date
```

The database server or a component thereof parses query "Q1". According to the techniques described herein, based on the predicates specified in query "Q1" and on the registrations of the functions of the "DOCIDX" index, the query optimizer of the database server recognizes that: the query predicate "CONTAINS (document, 'Oracle')>0" can be evaluated using the primary property of the "DOCIDX" user-defined index; the query predicate "pub_date between '01/01/2007' and '12/31/2007'" can be evaluated by using the filtering auxiliary property of the "DOCIDX" index; and the ORDER BY clause ("order by pub_date") can be evaluated by using the ordering property of the "DOCIDX" index.

In accordance with the techniques described herein, the query optimizer generates the following execution plans:

EP1—an execution plan that does not specify use the "DOCIDX" user-defined index to evaluate any portion of query "Q1";

EP2—an execution plan that specifies use only of the primary property of the "DOCIDX" user-defined index to evaluate the predicate "CONTAINS (document, 'Oracle')>0", but does not specify use of any of the filtering or ordering auxiliary properties of the index;

EP3—an execution plan that specifies use of the primary property of the "DOCIDX" user-defined index to evaluate the predicate "CONTAINS (document, 'Oracle')>0" and use of the filtering property to evaluate the predicate "pub_date between '01/01/2007' and '12/31/2007'", but does not specify use of the ordering auxiliary property to sort any results that are returned to the database server;

EP4—an execution plan that specifies use of the primary property of the "DOCIDX" user-defined index to evaluate the predicate "CONTAINS (document, 'Oracle')>0" and use of the ordering property to sort the results returned to the database server according to the order specified in the ORDER BY clause of query "Q1", but does not specify use of the filtering auxiliary property to filter any results that are returned to the database server; and EP5—an execution plan that specifies: use of the primary property of the "DOCIDX" user-defined index to evaluate the predicate "CONTAINS (document, 'Oracle')> 0"; use of the filtering property to evaluate the predicate "pub_date between '01/01/2007' and '12/31/2007'"; and use of the ordering property to sort the results returned to the database server according to the order specified in the ORDER BY clause of query "Q1".

The query optimizer then estimates a total cost for each of execution plans EP1, EP2, EP3, EP4, and EP5. The query optimizer estimates the total cost for execution plan EP1 using conventional mechanisms since this execution plan does not specify use of the "DOCIDX" user-defined index. For example, using conventional mechanisms, the query optimizer may generate a plurality of execution plans that do not specify use of the "DOCIDX" index, and may select as execution plan EP1 the best of these plans.

According to the techniques described herein, in estimating the total costs for each of execution plans EP2, EP3, EP4, and EP5, the query optimizer makes calls to the cost and selectivity functions of user-defined index "DOCIDX". For example, when estimating the total cost for execution plan EP2, the query optimizer would invoke the cost and selectivity functions for the primary property of the "DOCIDX" index. Similarly, when estimating the total cost for execution plan EP3, the query optimizer would invoke the cost and selectivity functions for the primary property and for the filtering auxiliary property of the "DOCIDX" index. When estimating the total cost for execution plan EP4, the query optimizer would invoke the cost and selectivity functions for the primary property and for the ordering auxiliary property of the "DOCIDX" index. When estimating the total cost for execution plan EP5, the query optimizer would invoke the cost and selectivity functions for the primary property of the "DOCIDX" index, for the filtering auxiliary property of the index, and for the ordering auxiliary property of the index.

In response to invoking the cost and selectivity functions for each of execution plans E2, E3, E4, and E5, the query optimizer receives the index costs that these functions return. Based on these index costs, the query optimizer determines a total cost for each of these plans according to the techniques described herein. For example, suppose that the total cost estimated for execution plan EP2 is C2, the total cost estimated for execution plan EP3 is C3, the total cost estimated for execution plan EP4 is C4, and that the total cost estimated for execution plan EP5 is C5. Also suppose that the query optimizer determines that the total cost estimated for execution plan EP1 is C1.

In accordance with the techniques described herein, the query optimizer compares the costs C1, C2, C3, C4, and C5. Suppose that the comparison yields that cost C5 is the lowest of all. Thus, the query optimizer selects execution plan EP5 as the optimal execution plan for query "Q1".

Thereafter, the database server uses execution plan EP5 to evaluate query "Q1". In execution plan EP5, evaluation of the query predicates "CONTAINS (document, 'Oracle')>0" and "pub_date between '01/01/2007' and '12/31/2007'" and of the ORDER BY clause is "pushed" into the "DOCIDX" index. (In this context, "pushing" the evaluation of certain query predicates and clauses into a user-defined index means that these query predicates and clauses are evaluated by the functions of the index instead of by the database server.)

Evaluating query "Q1" according execution plan EP5 involves the database server or a component thereof invoking a function of the "DOCIDX" index; when invoked the function: evaluates the query predicate that specifies the "CONTAINS" operator; evaluates the condition specified in the query predicate "pub_date between '01/01/2007' and '12/31/2007'" by filtering out the index entries which correspond to data rows of table "DOC" in which the value in the "pub_date" column is not within the values of "01/01/2007" and "12/31/2007"; and evaluates the ORDER BY clause ("order by pub_date") of query "Q1" by sorting the index entries according to the values of the "pub_date" column in the corresponding data rows.

After the function of the "DOCIDX" index completes the evaluation of predicates and the ORDER BY clause of query "Q1", the function returns to the database server a set of row identifiers. The returned set of row identifiers identifies those rows of table "DOC" which satisfy both the query predicate that specifies the "CONTAINS" operator and the query predicate "pub_date between '01/01/2007' and '12/31/2007'". In addition, the returned set of row identifiers is sorted according to the "pub_date" as specified in the ORDER BY clause of query "Q1". The database server then generates the result set of rows for query "Q1" by retrieving the rows identified by the returned set of row identifiers in the order specified therein. The database server then returns the result set of rows to the client that sent query "Q1".

In this manner, the techniques described herein provide for determining optimal execution plans that can be used to evaluate queries in an optimal manner.

Hardware Overview

Figure 3:
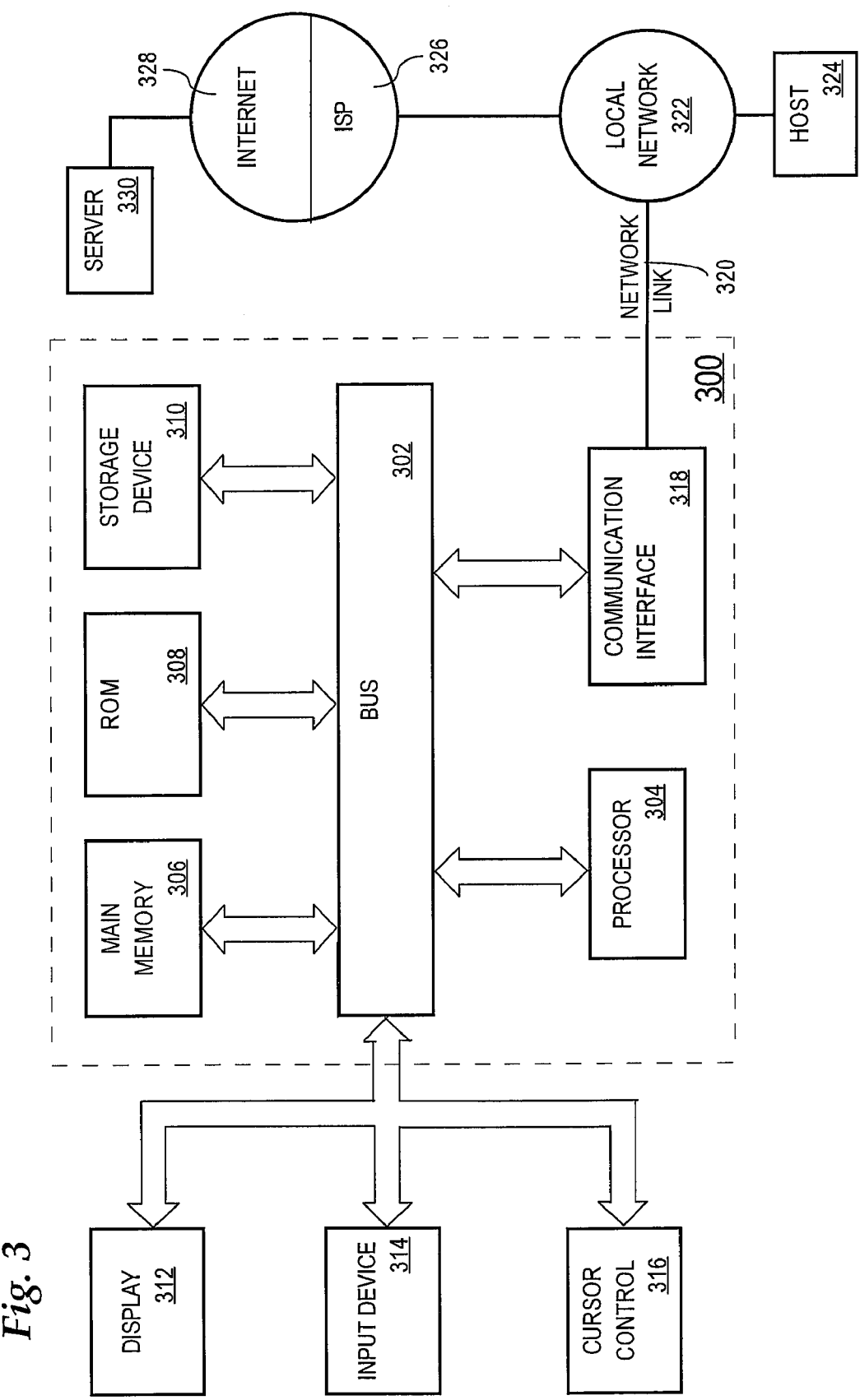
FIG. 3 is a block diagram that illustrates a computer system upon which an embodiment may be implemented.

FIG. 3 is a block diagram that illustrates a computer system 300 upon which an embodiment of the techniques described herein may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a machine to operate in a specific fashion. In an embodiment implemented using computer system 300, various computer-readable media are involved, for example, in providing instructions to processor 304 for execution. Such a medium may take many forms, including but not limited to storage media and transmission media. Storage media includes both non-volatile media and volatile media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine such as, for example, a computer system.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
    a database server registering one or more functions included in a user-defined index that includes a primary property and one or more auxiliary properties;
    wherein the primary property and each of the one or more auxiliary properties are operational properties that provide for evaluation operations that use the user-defined index, and wherein:
        the primary property is implemented in the one or more functions to provide for an evaluation operation of a user-defined operator that is associated with the user-defined index; and
        the one or more auxiliary properties are implemented in the one or more functions to provide for respective one or more evaluation operations that are different than, and in addition to, the evaluation operation of the user-defined operator that is associated with the user-defined index;
    receiving a query that specifies one or more parameters;
    generating a plurality of execution plans for evaluating the query;
    estimating a plurality of total costs respectively associated with the plurality of execution plans, wherein estimating a particular total cost associated with a particular execution plan comprises:
        the database server invoking the one or more functions with one or more function arguments based on the one or more parameters;
        the database server receiving one or more index costs from the one or more functions, wherein the one or more index costs are associated with using the one or more auxiliary properties of the user-defined index to evaluate the query, and wherein the one or more index costs are different than the cost of using the user-defined index to evaluate the user-defined operator associated with the user-defined index; and
        determining the particular total cost based on the one or more index costs; and
    selecting and storing an optimal execution plan from the plurality of execution plans, wherein the optimal execution plan is associated with an optimal total cost of the plurality of total costs;
    wherein the method is performed by one or more computer systems.

2. The method of claim 1, wherein:
the one or more auxiliary properties of the user-defined index include a filtering auxiliary property that is defined by a list of table columns; and
the filtering auxiliary property provides for filtering index entries of the user-defined index based on conditions associated with the list of table columns.

3. The method of claim 2, wherein:
the one or more parameters specified in the query comprise a predicate that defines a particular condition associated with one or more columns in the list of table columns; and
the database server receiving the one or more index costs comprises receiving a particular index cost from the one or more functions, wherein the particular index cost is associated with filtering the index entries of the user-defined index based on the particular condition.

4. The method of claim 1, wherein:
the one or more auxiliary properties of the user-defined index include an ordering auxiliary property that is defined by a list of table columns; and
the ordering auxiliary property provides for sorting index entries of the user-defined index based on an order defined by the list of table columns.

5. The method of claim 4, wherein:
the one or more parameters specified in the query comprise an order-by clause that defines a particular order associated with one or more columns in the list of table columns; and
the database server receiving the one or more index costs comprises receiving a particular index cost from the one or more functions, wherein the particular index cost is associated with sorting the index entries of the user-defined index based on the particular order.

6. The method of claim 1, wherein:
the one or more auxiliary properties of the user-defined index include:
 a filtering auxiliary property that is defined by a first list of table columns; and
 an ordering auxiliary property that is defined by a second list of table columns;
the filtering auxiliary property provides for filtering index entries of the user-defined index based on conditions associated with the first list of table columns; and
the ordering auxiliary property provides for sorting the index entries of the user-defined index based on an order defined by the second list of table columns.

7. The method of claim 6, wherein:
the one or more parameters specified in the query comprise:
 a first predicate that defines a first condition associated with first one or more columns in the first list of table columns; and
 an order-by clause that defines a particular order associated with second one or more columns in the second list of table columns; and
the database server receiving the one or more index costs comprises:
 receiving a first index cost from the one or more functions, wherein the first index cost is associated with filtering the index entries of the user-defined index based on the first condition; and
 receiving a second index cost from the one or more functions, wherein the second index cost is associated with sorting the index entries of the user-defined index based on the particular order.

8. The method of claim 7, wherein:
the one or more parameters specified in the query further comprise a second predicate that defines a second condition based on the user-defined operator; and
the database server receiving the one or more index costs comprises receiving a third index cost from the one or more functions, wherein the third index cost is associated with evaluating the second condition based on the user-defined operator against the index entries of the user-defined index.

9. The method of claim 1, wherein the one or more functions include one or more of:
a cost function which, when invoked, returns a cost that would be incurred when the one or more auxiliary properties are used to evaluate a query portion based on index entries of the user-defined index; and
a selectivity function which, when invoked, returns a selectivity value associated with using the one or more auxiliary properties to evaluate a query portion based on the index entries of the user-defined index.

10. The method of claim 1, wherein estimating the particular total cost associated with the particular execution plan further comprises:
the database server determining whether the particular execution plan provides for accessing the user-defined index to evaluate the query; and
the database server performing the steps of invoking the one or more functions, receiving the one or more index costs from the one or more functions, and determining the particular total cost based on the one or more index costs, only when the particular execution plan provides for accessing the user-defined index to evaluate the query.

11. The method of claim 10, wherein the database server determining whether the particular execution plan provides for accessing the user-defined index to evaluate the query further comprises:
determining whether the one or more parameters specified in the query include any predicate that defines any condition based on the user-defined operator; and
deciding that the particular execution plan provides for accessing the user-defined index when the one or more parameters include at least one predicate that defines at least one condition based on the user-defined operator.

12. A non-transitory computer-readable storage medium storing one or more sequences of instructions which, when executed by one or more processors, cause the one or more processors to perform steps comprising:
a database server registering one or more functions included in a user-defined index that includes a primary property and one or more auxiliary properties;
wherein the primary property and each of the one or more auxiliary properties are operational properties that provide for evaluation operations that use the user-defined index, and wherein:
 the primary property is implemented in the one or more functions to provide for an evaluation operation of a user-defined operator that is associated with the user-defined index; and
 the one or more auxiliary properties are implemented in the one or more functions to provide for respective one or more evaluation operations that are different than, and in addition to, the evaluation operation of the user-defined operator that is associated with the user-defined index;

receiving a query that specifies one or more parameters;
generating a plurality of execution plans for evaluating the query;
estimating a plurality of total costs respectively associated with the plurality of execution plans, wherein estimating a particular total cost associated with a particular execution plan comprises:
the database server invoking the one or more functions with one or more function arguments based on the one or more parameters;
the database server receiving one or more index costs from the one or more functions, wherein the one or more index costs are associated with using the one or more auxiliary properties of the user-defined index to evaluate the query, and wherein the one or more index costs are different than the cost of using the user-defined index to evaluate the user-defined operator associated with the user-defined index; and
determining the particular total cost based on the one or more index costs; and
selecting and storing an optimal execution plan from the plurality of execution plans, wherein the optimal execution plan is associated with an optimal total cost of the plurality of total costs.

13. The non-transitory computer-readable storage medium of claim 12, wherein:
the one or more auxiliary properties of the user-defined index include a filtering auxiliary property that is defined by a list of table columns; and
the filtering auxiliary property provides for filtering index entries of the user-defined index based on conditions associated with the list of table columns.

14. The non-transitory computer-readable storage medium of claim 13, wherein:
the one or more parameters specified in the query comprise a predicate that defines a particular condition associated with one or more columns in the list of table columns; and
the instructions that cause the database server to receive the one or more index costs comprise instructions which, when executed by the one or more processors, cause the database server to receive a particular index cost from the one or more functions, wherein the particular index cost is associated with filtering the index entries of the user-defined index based on the particular condition.

15. The non-transitory computer-readable storage medium of claim 12, wherein:
the one or more auxiliary properties of the user-defined index include an ordering auxiliary property that is defined by a list of table columns; and
the ordering auxiliary property provides for sorting index entries of the user-defined index based on an order defined by the list of table columns.

16. The non-transitory computer-readable storage medium of claim 15, wherein:
the one or more parameters specified in the query comprise an order-by clause that defines a particular order associated with one or more columns in the list of table columns; and
the instructions that cause the database server to receive the one or more index costs comprise instructions which, when executed by the one or more processors, cause the database server to receive a particular index cost from the one or more functions, wherein the particular index cost is associated with sorting the index entries of the user-defined index based on the particular order.

17. The non-transitory computer-readable storage medium of claim 12, wherein:
the one or more auxiliary properties of the user-defined index include:
a filtering auxiliary property that is defined by a first list of table columns; and
an ordering auxiliary property that is defined by a second list of table columns;
the filtering auxiliary property provides for filtering index entries of the user-defined index based on conditions associated with the first list of table columns; and
the ordering auxiliary property provides for sorting the index entries of the user-defined index based on an order defined by the second list of table columns.

18. The non-transitory computer-readable storage medium of claim 17, wherein:
the one or more parameters specified in the query comprise:
a first predicate that defines a first condition associated with first one or more columns in the first list of table columns; and
an order-by clause that defines a particular order associated with second one or more columns in the second list of table columns; and
the instructions that cause the database server to receive the one or more index costs comprise instructions which, when executed by the one or more processors, cause the database server to:
receive a first index cost from the one or more functions, wherein the first index cost is associated with filtering the index entries of the user-defined index based on the first condition; and
receive a second index cost from the one or more functions, wherein the second index cost is associated with sorting the index entries of the user-defined index based on the particular order.

19. The non-transitory computer-readable storage medium of claim 18, wherein:
the one or more parameters specified in the query further comprise a second predicate that defines a second condition based on the user-defined operator; and
the instructions that cause the database server to receive the one or more index costs comprise instructions which, when executed by the one or more processors, cause the database server to receive a third index cost from the one or more functions, wherein the third index cost is associated with evaluating the second condition based on the user-defined operator against the index entries of the user-defined index.

20. The non-transitory computer-readable storage medium of claim 12, wherein the one or more functions include one or more of:
a cost function which, when invoked, returns a cost that would be incurred when the one or more auxiliary properties are used to evaluate a query portion based on index entries of the user-defined index; and
a selectivity function which, when invoked, returns a selectivity value associated with using the one or more auxiliary properties to evaluate a query portion based on the index entries of the user-defined index.

21. The non-transitory computer-readable storage medium of claim 12, wherein the instructions that cause estimating the particular total cost associated with the particular execution plan further comprise instructions which, when executed by the one or more processors, cause:

the database server determining whether the particular execution plan provides for accessing the user-defined index to evaluate the query; and the database server performing the steps of invoking the one or more functions, receiving the one or more index costs from the one or more functions, and determining the particular total cost based on the one or more index costs, only when the particular execution plan provides for accessing the user-defined index to evaluate the query.

22. The non-transitory computer-readable storage medium of claim 21, wherein the instructions that cause the database server determining whether the particular execution plan provides for accessing the user-defined index to evaluate the query further comprise instructions which, when executed by the one or more processors, cause:

determining whether the one or more parameters specified in the query include any predicate that defines any condition based on the user-defined operator; and deciding that the particular execution plan provides for accessing the user-defined index when the one or more parameters include at least one predicate that defines at least one condition based on the user-defined operator.

* * * * *